United States Patent [19]

Sassa et al.

[11] Patent Number: 4,903,612
[45] Date of Patent: Feb. 27, 1990

[54] INTERCAR GANGWAY FOR ARTICULATED CARS

[75] Inventors: Takamitsu Sassa, Nagoya; Minoru Ishikawa, Konan; Mikio Hatano, Kasugai, all of Japan

[73] Assignees: Nippon Sharyo, Ltd.; Narita Seisakusho Mfg., Ltd., both of Japan

[21] Appl. No.: 293,125

[22] Filed: Jan. 3, 1989

[30] Foreign Application Priority Data

Mar. 11, 1988 [JP] Japan ................... 63-59117

[51] Int. Cl.$^4$ ............................................. B60D 5/00
[52] U.S. Cl. ...................................................... 105/18
[58] Field of Search ........................ 105/8.1, 15, 18, 20

[56] References Cited

U.S. PATENT DOCUMENTS 4,318,345 3/1982 Kleim ................... 105/15
4,411,201 10/1983 Hassel et al. ................ 105/18 X

FOREIGN PATENT DOCUMENTS 2318369 10/1974 Fed. Rep. of Germany ........ 105/18
2826779 1/1980 Fed. Rep. of Germany ........ 105/18
60-58579 4/1985 Japan .
60-61968 4/1985 Japan .

Primary Examiner—Duane A. Reger
Attorney, Agent, or Firm—Leydig, Voit & Mayer

[57] ABSTRACT

A corridor apparatus of an articulating section for use in articulated cars comprises: a pair of rectangular outer corridors respectively provided to end surfaces of car bodies to be articulated, in such a manner as to project therefrom and surround corridor entrances of the car bodies; a pair of rectangular inner corridors each adapted to partially fit with each of the outer corridors in a connected manner; and a pair of gate-shaped inner frames each connected to the other end of each of the inner corridors, the inner frames being fitted with each other such as to be swingable in the direction of the articulating section's corridor with lower ends thereof as a supporting point, wherein the rectangular outer corridors, the inner corridors, and the inner frames constitute peripheral walls of the articulating section's corridor, fitting portions of the outer corridors and the inner corridors are arranged to be rotatable around a center point of the articulating section's corridor, coupling portions of each of the inner corridors and each of the inner frames are adapted to move together with respect to movement in the direction of the articulating section's corridor and can be slid and displaced rative to each other with respect to a direction perpendicular to that of the articulating section's corridor.

3 Claims, 12 Drawing Sheets

FIG. 10
FIG. 11
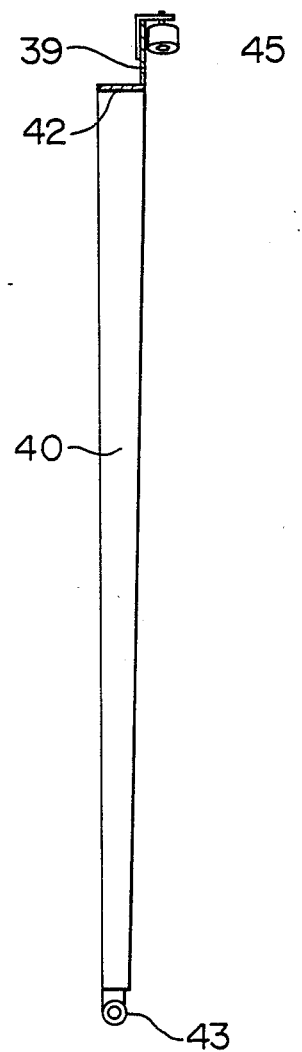
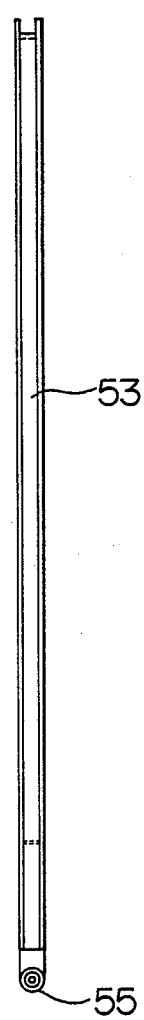

INTERCAR GANGWAY FOR ARTICULATED CARS

BACKGROUND OF THE INVENTION

The present invention relates to a intercar gangway of an articulating section for use in articulated cars.

Conventionally, the gangway of an articulating section between articulated cars is generally arranged with its surroundings covered with stretchable hood cloth.

In the conventional gangway of the articulating section constituted by the hood cloth, there have been drawbacks in that the safety in passage of passengers through the gangway as well as roominess and decor of the gangway of the articulating section are aggravated.

SUMMARY OF THE INVENTION

Accordingly, an object of the present invention is to provide an intercar gangway of an articulating section for use in articulated cars in which the gangway of the articulating section can be formed with hard decorative boards, which ensures the above-described safety and is provided with the roominess and decor equivalent to those of a car component, and in which component members of the articulating section are capable of following various movements of the articulated cars without causing any impediments, thereby overcoming the above-described drawbacks of the prior art.

To this end, according to one aspect of the invention, there is provided a gangway apparatus of an articulating section for use in articulated cars, comprising: a pair of rectangular outer corridors respectively provided to end framing of car bodies to be articulated, in such a manner as to project therefrom and surround corridor entrances of the car bodies; a pair of rectangular inner corridors each adapted to partially fit with each of the outer corridors in a connected manner; and a pair of gate-shaped inner frames each connected to the other end of each of the inner corridors, the inner frames being fitted with each other such as to be swingable in the direction of the articulating section's corridor with lower ends thereof as a supporting point, wherein the rectangular outer corridors, the inner corridors and the inner frames constitute peripheral walls of the articulating section's corridor, fitting portions of the outer corridors and the inner corridors are arranged to be rotatable around a center point of the articulating section's corridor, coupling portions of each of the inner corridors and each of the inner frames are adapted to move together with respect to movement in the direction of the articulating section's corridor and can be slid and displaced relative to each other with respect to a direction perpendicular to that of the articulating section's corridor.

According to another aspect of the invention, the gangway apparatus further comprises: a shell support provided around outer peripheries of intermediate portions of the inner frames with a lower end thereof serving as a supporting point, the inner frames and the shell support being coupled with each other by means of a coupling bar expandable in the direction of the articulating section's corridor; and a stretchable diaphragm disposed between the shell support and the outer corridors.

According to another aspect of the invention, the gangway apparatus still further comprises: side covers each disposed on the outer peripheries of the end framings of the car bodies such as to project therefrom and oppose each other; and a pair of center covers each of which is disposed on the inner sides of the side covers and whose opposite sides overlap with the side covers.

When the articulated cars travel on a horizontally curved track, the outer corridors secured to the end framings of the car bodies rotate with the center point of the articulating section's corridor as a center.

When the articulated cars undergo rolling, the coupled portions of the inner corridors and the inner frames rotate in a direction perpendicular to that of the articulating section's corridor relative to each other.

When the articulated cars pass on a convex-shaped curved track, the upper portions of the inner frames move mutually in the opening direction.

When the articulated cars pass on a concave-shaped curved track, the upper portions of the inner frames move mutually in the closing direction.

In addition, when the articulated car bodies are displaced, the shell support is always located in the center of the articulating section's corridor and maintains the diaphragm split into two.

Furthermore, since the center cover is supported by the shell support, and its center is always located at an intermediate position between the side covers.

According to the present invention, since the inner surfaces of the peripheral walls of the articulating section's corridor can be formed with hard decorative board without causing a large gap when the car bodies are displaced, it is possible to secure the safety in the passage of passengers and to provide roomines and decor as in the case of the car compartment. Moreover, even if the articulating section's corridor is formed with such a hard materials, it is possible to allow its various components to follow various movements of the articulated cars without causing hindrances. Furthermore, since the outer parts of the components parts constituting the articulating section's corridor are covered with a diaphragm, the interior of the articulating section's corridor can be held watertight and airtight from the outside even by the diaphragm even if a gap is present between the members, and the noise can be shut off. Since the center covers are provided between the side covers in an overlapping manner, the outer appearance of the articulating section's corridor can be enhanced, and it is possible to prevent passengers from falling down to the track at a platform of station.

BRIEF DESCRIPTION OF THE DRAWINGS

The drawings illustrate an embodiment of the present invention, in which

FIG. 10 is a side cross-sectional view thereof;

FIG. 11 is a side view of a shell support;

DESCRIPTION OF THE PREFERRED EMBODIMENTS

Referring now to the accompanying drawings, a description will be given of an embodiment of the present invention.

Figure 6:
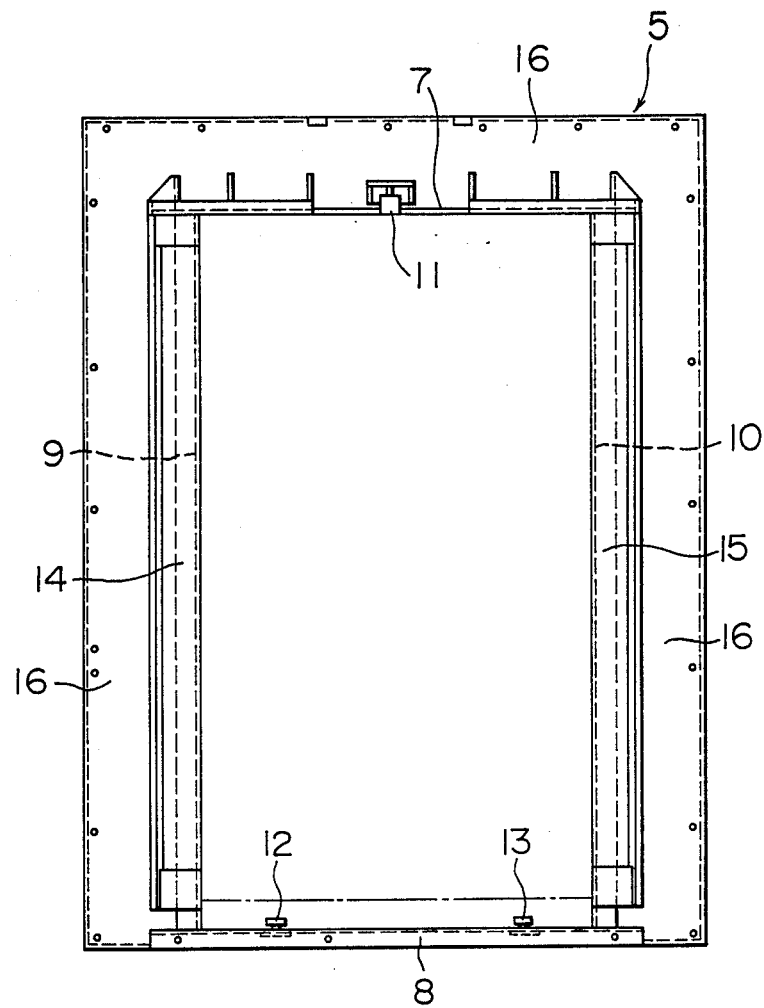
FIG. 6 is a front view of an outer corridor.

Reference numerals 1, 2 denote articulated cars, and rectangular outer corridors 5, 6 are secured to end framing 1a, 2a of the cars in such a manner as to surround corridor entrances 3, 4, respectively. The front configuration of one outer corridor 5 is shown in FIG. 6, and the outer corridor 5 is formed into a rectangular shape comprising an upper frame 7, a lower frame 8, and side frames 9, 10. An upper roller 11 which rotates in a plane with a vertical axis as a center is provided in the center of the upper frame 7, while lower rollers 12, 13 each rotating in a plane with a vertical axis as a center are provided on opposite side portions of the lower frame 8 facing the interior of the corridor. Half sides of the side frames 9, 10 on the side of a center point 0 of the articulating section's corridor are respectively formed into arcuate guide walls 14, 15 with the center point 0 of the articulating section's corridor. Diaphragm installation seats 16 are provided integrally on an upper portion and side portions of the outer corridor 5 in such a manner as to project therefrom. The other outer corridor 6 is formed in a manner similar to that of the outer corridor 5, and the same components are denoted by the same reference numerals and a description thereof will be omitted. The outer corridors 5, 6 are respectively secured to and supported by the end framing 1a, 2a of the car bodies 1, 2 by means of bolts 18 via baseplates 17a, 17b.

Figure 1:
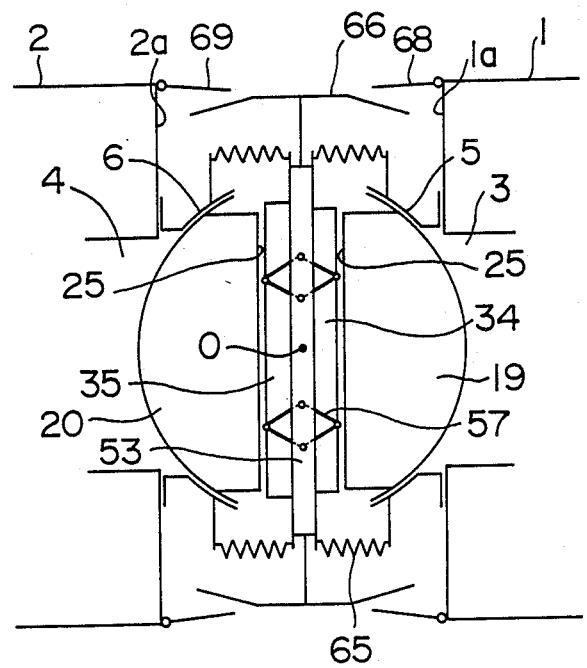
FIG. 1 is a schematic horizontal cross-sectional view.
Figure 2:
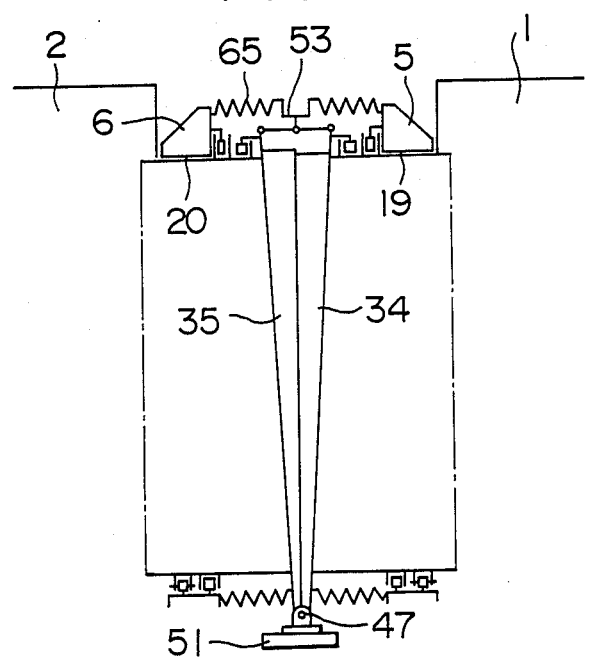
FIG. 2 is a schematic side cross-sectional view.
Figure 3:
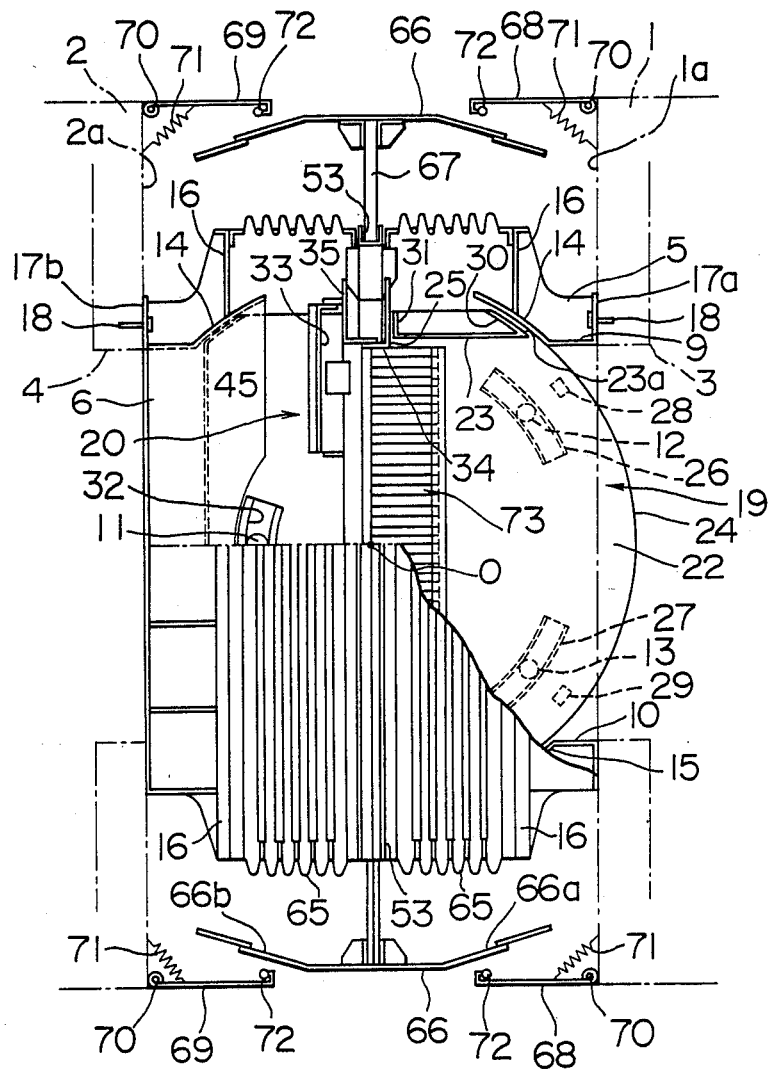
FIG. 3 is a horizontal cross-sectional view, a part thereof being a top plan view.
Figure 7:
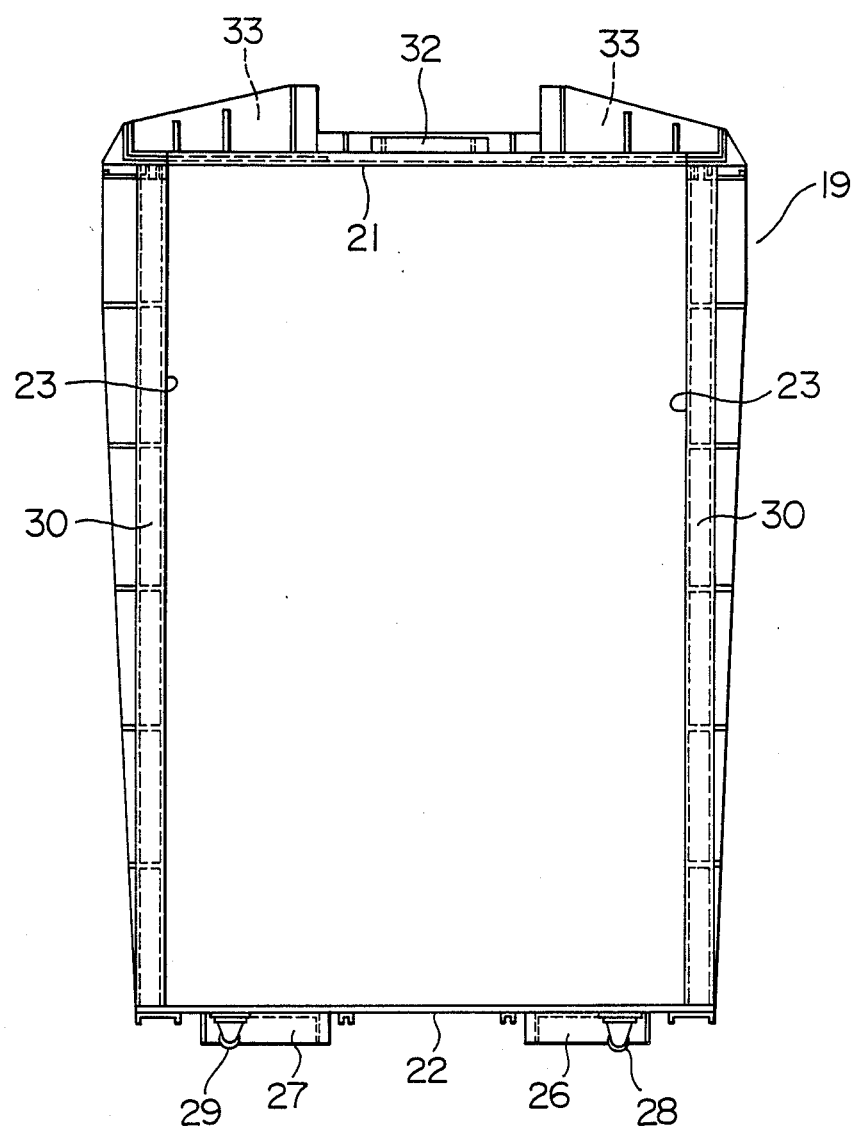
FIG. 7 is a rear view of an inner corridor.
Figure 8:
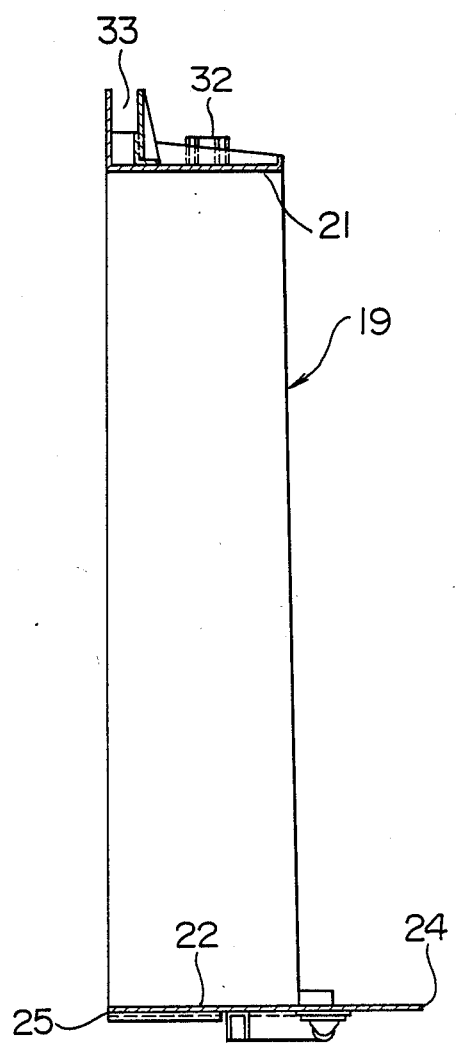
FIG. 8 is a side cross-sectional view thereof.

Inner corridors 19, 20 are so arranged as to be partially fitted with the inner sides of the outer corridors 5, 6. As shown in FIG. 7, one corridor 19 is formed into a rectangular shape comprising an upper frame 21, a lower plate 22, and side frames 23. At the same time, the upper frame 21, the lower plate 22, and the side frames 23 are formed into dimensions that allow them to be fitted movably with the underside of the upper frame 7 of the outer corridor 5, the upper side of the lower frame 8 of the outer corridor 5, and the inner sides of the arcuate guide walls 14, 15 of the outer corridor 5, respectively. In addition, as shown in FIG. 3, an edge 24 of the lower plate 22 on the side of the car body is formed substantially into a semi-circle having substantially the same radius as the inner surfaces of the guide walls 14, 15 with the center point 0 of the articulating section's corridor as a center. Meanwhile, an edge 25 of the lower plate 22 on the side of the center of the articulating section is located at a position adjacent to the center of the articulating section's corridor and is formed in a plane perpendicular to the direction of the corridor. Lower guide grooves 26, 27, which are formed of groove-shaped steel and into which the rollers 12, 13 provided on the lower frame 8 of the outer corridor 5 are fitted rotatably, are secured to the lower surface of the lower plate 22 and is formed into an arcuate shape with the center point 0 of the articulating section's corridor as a center. In addition, rollers 28, 29 that are mounted on the lower frame 8 of the outer corridor are provided on the lower surface of the lower plate 22. Edges 23a of the side frames 23 on the side of the car body extend up to the positions where the guide walls 14, 15 of the outer corridor 5 are located. The outer surfaces of the edges 23' are formed into arcuate surfaces 30 extending along the inner surfaces of the guide walls 14, 15, respectively. Edges 31 of the side frames 23 on the side of the center of the articulating section's corridor are located in the same plane as that of the edge 25 of the lower plate 22 on the side of the center of the articulating section's corridor. The width of the upper frame 21 in the direction of the car body is set to be identical as those of the side frames 23. Meanwhile, an upper guide groove 32, which is located at a portion for fitting with the upper roller 11 of the outer corridor 5 and is formed of groove-shaped steel with its upper side open, is secured to the upper surface of the upper frame 21 and is formed into an arcuate shape with the center point 0 of the articulating section's corridor as a center. In addition, at the side portions of the edge of the upper frame 21 on the side of the center of the articulating section are formed engaging grooves 33 which are formed of groove-shaped steel with their upper sides opening along the edge.

Figure 4:
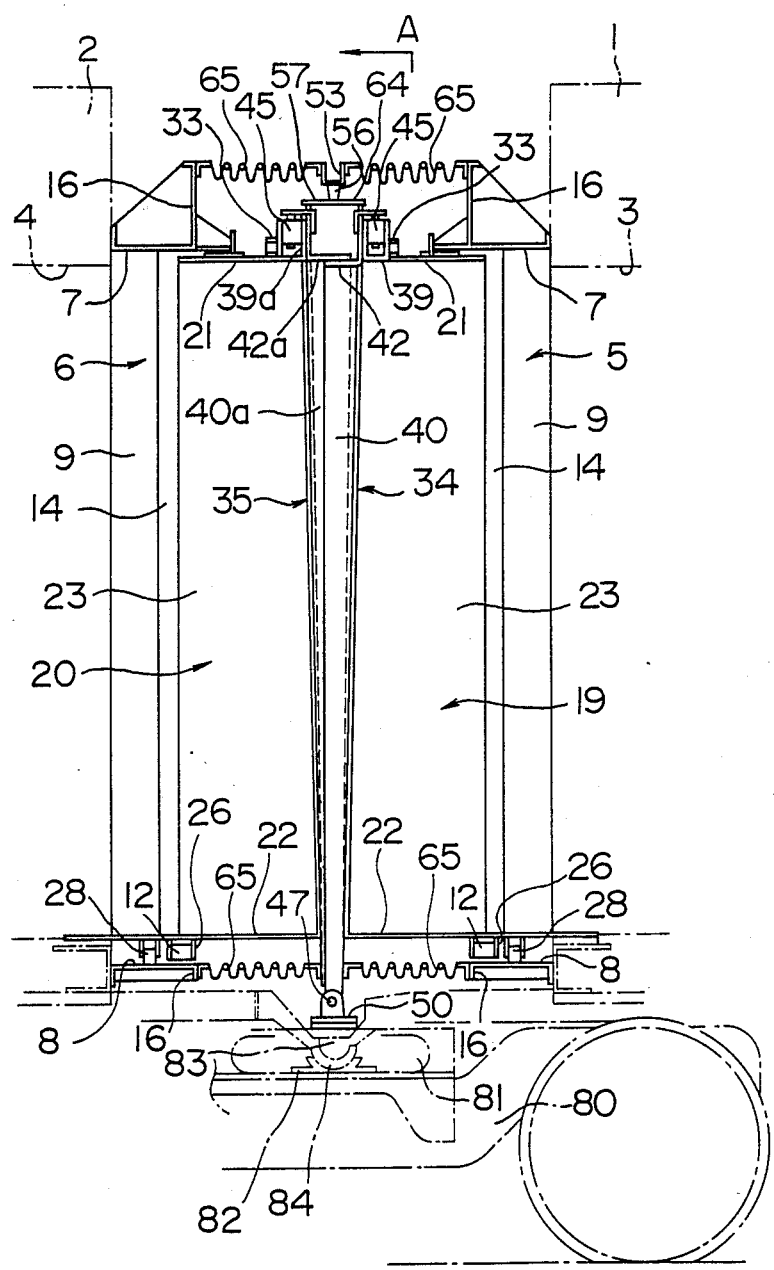
FIG. 4 is a side cross-sectional view.

As shown in FIGS. 3 and 4, the arrangement is as follows: The lower guide grooves 26, 27 of the inner corridor 19 are fitted with the lower rollers 12, 13 of the outer corridor 5, and the rollers 28, 29 are placed on the upper surface of the lower plate 8 of the outer corridor to have the weight of the inner corridor 19 supported by the outer corridor 5. Meanwhile, the upper guide groove 32 is fitted with the upper roller 11 of the outer corridor 5 to fit together and connect the inner corridor 19 and the outer corridor. Thus, the corridors 5, 19 are capable of rotating in a plane relative to each other with the center point 0 of the articulating section's corridor as a center.

It should be noted that the other inner corridor 20 is formed in a manner similar to that of the above-described inner corridor 19, and is also fitted with and connected to the other outer corridor 6 in a similar manner so as to be capable of rotating in a plane relative to each other in a manner as the one described above.

Figure 9:
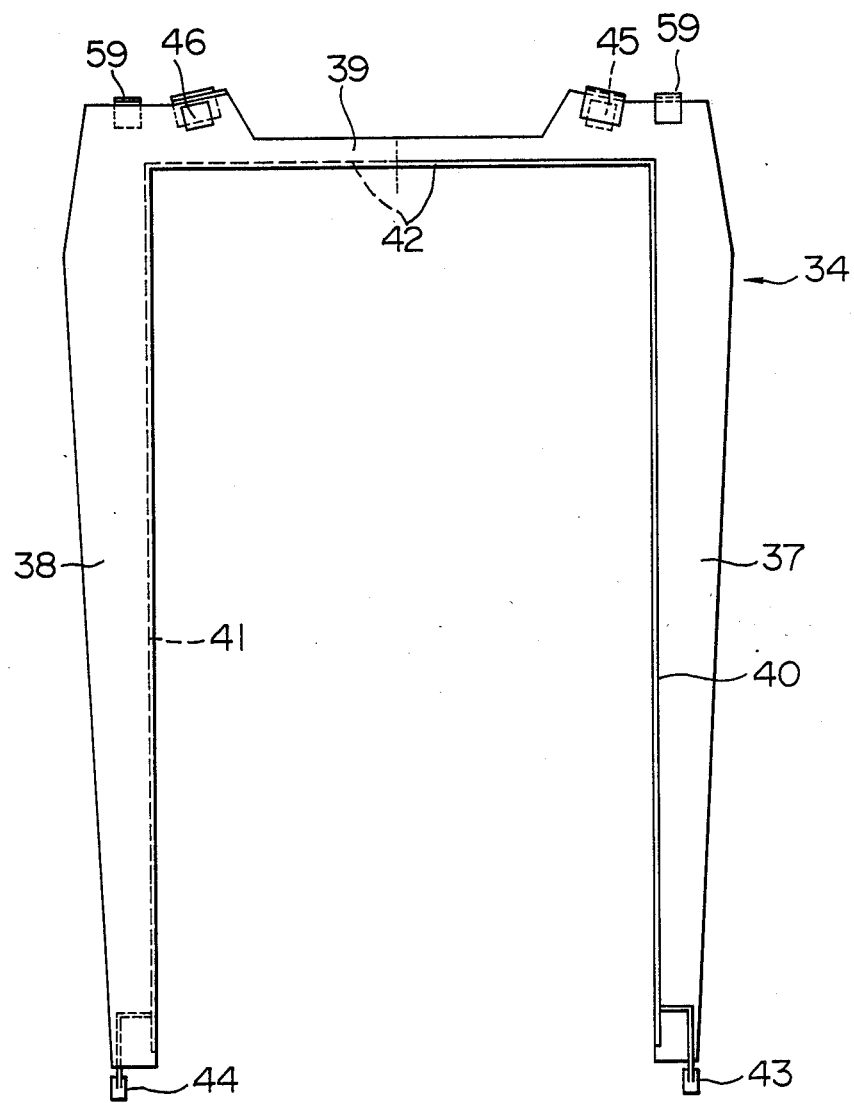
FIG. 9 is a front view of an inner frame, the right-hand side thereof being a front view and the left-hand side thereof being a rear view.

A pair of inner frames 34, 35 are arranged as follows: As shown in FIGS. 9 and 10, one inner frame 34 is formed into a shape of gate comprising left and right frames 37, 38 and an upper frame 39. Side walls 40, 41 and an upper wall 42 that are directed to the side of the center of the articulating section are formed integrally on the inner sides of the left and right frames 37, 38 and the upper frame 39. As shown in FIG. 10, the side walls 40, 41 are formed into a shape of wedge in which a width thereof becomes gradually wider toward the top. Hinge members 43, 44 are secured to the lower ends of the side walls 40, 41 in such a manner as to project therefrom. In addition, rollers 45, 46 which fit with the upper guide grooves provided in the inner corridor 19 are respectively provided at side portions of the upper frame 39 in such a manner as to be rotatable by inclined support shafts relative to the vertical direction.

The other inner frame 35 is formed in a manner similar to that of the inner frame 34. However, side walls 40a and an upper wall 42a of the other inner frame 35 are formed into dimensions that fit slidably with the outer sides of the side walls 40, 41 and the upper wall 42 of the inner frame 45, as shown in FIG. 4.

Figure 5:
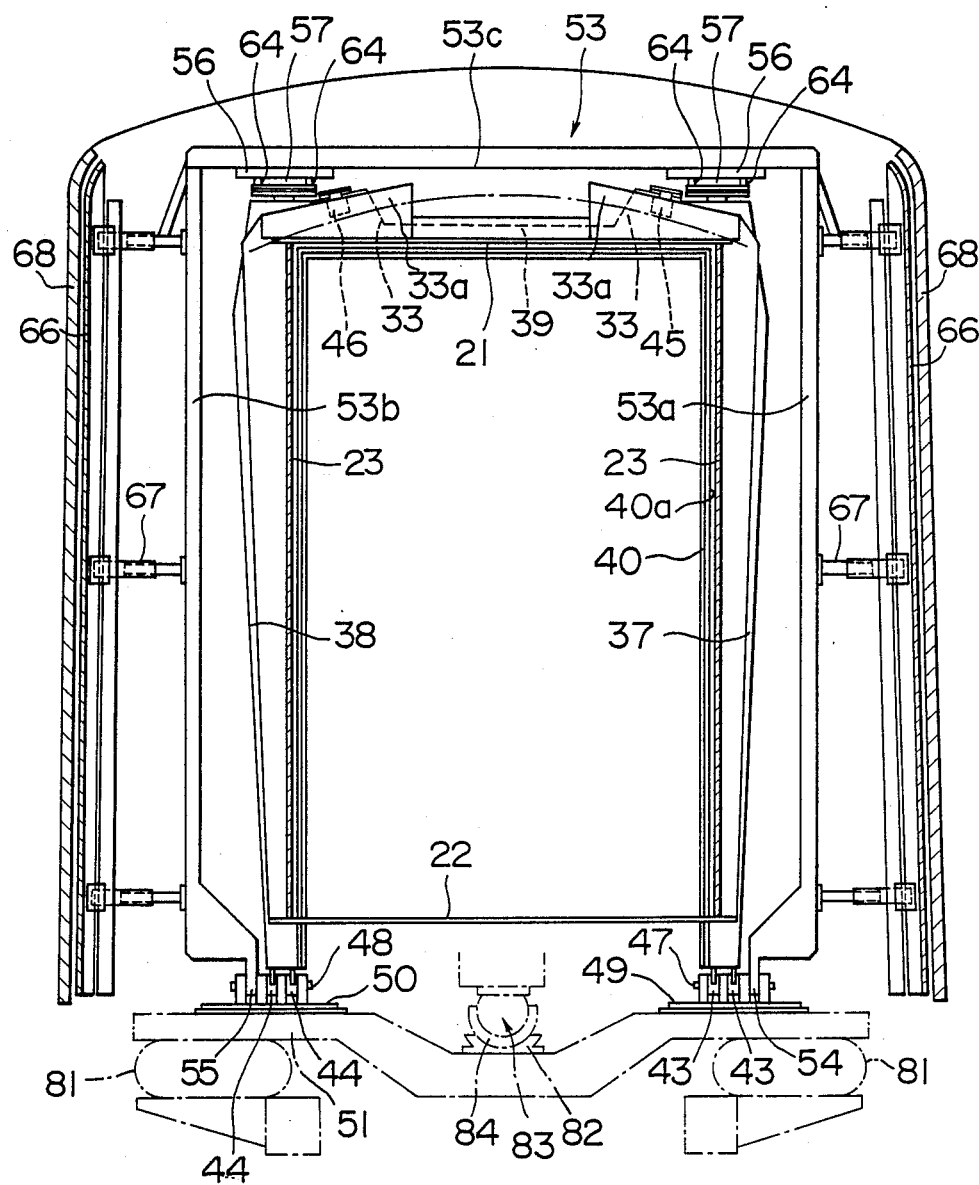
FIG. 5 is a cross-sectional view taken along the line A—A of FIG. 4.

The inner frames 34, 35 are fitted together, as shown in FIG. 4, and the hinge members 43 provided in the side frames 37 on one side that fit with each other in the inner frames 34, 35 are supported by a common pin 47, as shown in FIG. 5, while the hinge members 44 of the other frames 38 that fit with each other are supported by a common pin 48. The pins 47, 48 are arranged such that the axes thereof are perpendicular to the direction of the articulating section's corridor and are located at positions of lines passing through the center point 0 of the articulating section's corridor. The inner frames 34, 35 are thus arranged such as to be capable of swinging relative to each other in the direction of the articulating section's corridor with an identical axis as a center. In addition, the pins 47, 48 are respectively secured to a bolster beam 51 of an articulated truck via baseplates 49, 50, as shown in FIG. 5. At the center point 0 of the intercoupling section's corridor, the bolster beam 51 is supported by pneumatic springs 81 respectively provided on left- and right-hand beams of the articulated truck 80, as shown in FIG. 4. In addition, a spherical bearing 82 is provided in the central portion of an upper surface of the bolster beam 51, and spherical bearings 83, 84 projecting from the front and rear car bodies are supported by the bearing 82. The arrangement is such that articulated motion is performed by a combination thereof. In addition, the rollers 45, 46 of the inner frame 34 are fitted from above with the engaging grooves 33 formed in the upper frame 21 of the inner corridor 19. Thus, when the upper portion of the inner corridor 19 has moved in the direction of the car body at the time when the car passes through a vertical curve, the upper part of the inner frame 34 also follows, while, at the time of rolling of the car, the inner corridor 19 and the inner frame 34 rotate in a direction perpendicular to the direction of the respective cars, thereby making it possible to cope with the above-described motion while maintaining a state in which the inner corridor 19 and the inner frame 34 are coupled. Incidentally, the other inner frame 35 and the other inner corridor 20 are coupled in the same manner as that described above.

As shown in FIG. 5, a shell support 53 is formed into the shape of a gate for covering the both sides and upper side of the inner frames 34, 35, and is formed of groove-shaped steel, as shown in FIG. 11. Hinges 54, 55 are respectively provided at lower ends of legs 53a, 53b of the shell support 53. The arrangement is such that the hinges 54, 55 are fitted rotatably with the pins 47, 48 so that the shell support 53 can swing in the direction of the intercoupling section's corridor around the pins 47, 48. In addition, guide grooves 56 formed of groove-shaped steel whose lower sides are open are formed at opposite side portions of the lower surface of the upper frame 53c.

Figure 12:
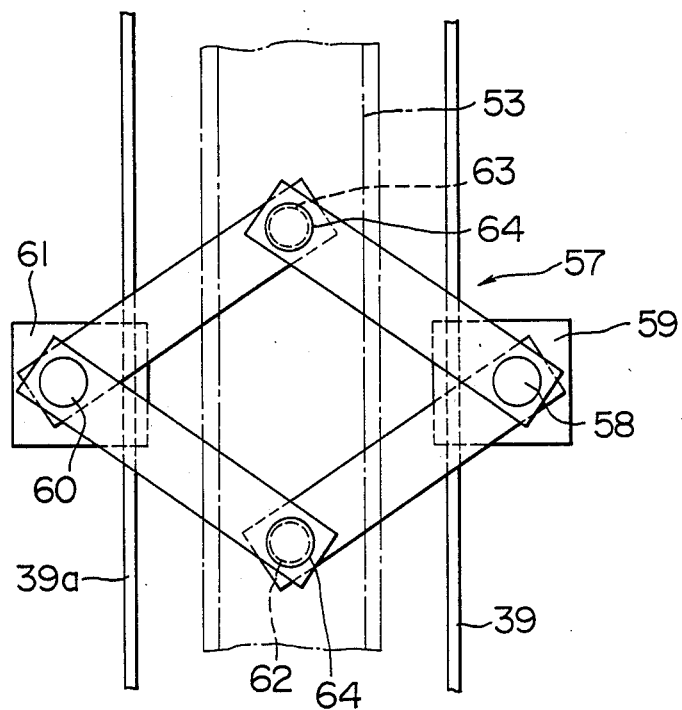
FIG. 12 is a top plan view of a connecting bar portion.
Figure 13:
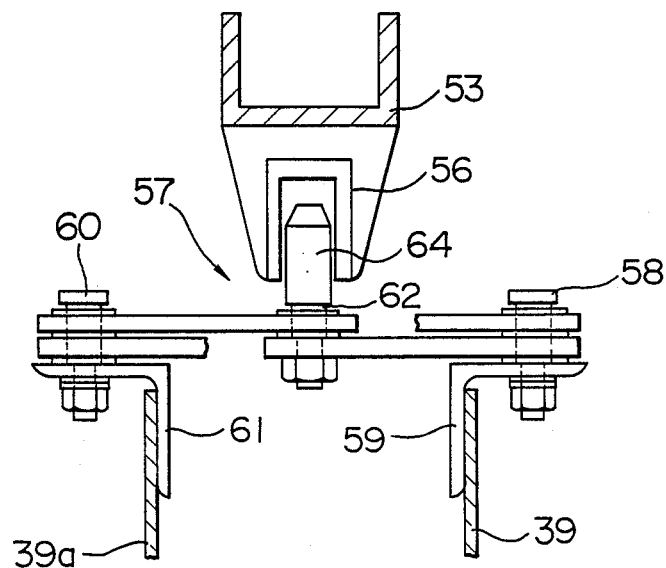
FIG. 13 is a side view thereof.

In FIGS. 4 and 5, a coupling bar 57 employs a planarly placed pantagraph mechanism. As shown in FIGS. 12 and 13, one coupling pin 58 of coupling pins in the lateral direction of a car body is rotatably connected to brackets 59 secured to the upper frame 39 of the inner frame 34, and the other coupling pin 60 is connected rotatably to brakets 61 secured to the upper frame 39a of the other inner frame 35. In addition, lateral coupling pins 62, 63 are respectively provided with guide pins 64 projecting upwardly, as shown in FIG. 13. The coupling bars 57 are provided on left- and right-hand side portions, as shown in FIG. 5, and are fitted with the guide grooves 56 in the shell support from below so as to support the upper portion of the shell support.

A stretchable diaphragm 65 is installed between the diaphragm installation seats 16 of the outer corridors 5, 6 and the shell support 53 and serves to maintain watertightness and airtightness between the articulated section's corridor and the outside and shut off the noise such as the traveling sound of the cars. Further, the diaphragm 65 is split into two parts with respect to the direction of the articulating section's corridor via the shell support 53.

Center covers 66 are provided on the outer side portions of the articulating section's corridor and are secured to and held by the tips of support arms 67 projecting outwardly from the legs 53a, 53b of the shell support 53.

Side covers 68, 69 project from opposite side portions of end framing 1a, 2a of the cars 1, 2. As shown in FIG. 3, the relationship between the center cover 66 and the side covers 68, 69 is such that extensions 66a, 66b which overlap with the side covers 68, 69 are formed in the center cover 66, and the extensions 66a, 66b are slightly bent inwardly. The arrangement is such that when the cars pass along a curved portion, the extensions 66a, 66b of the center cover 66 and the side covers 68, 69 do not contact each other excessively. In addition, the center cover 66 plays the role of maintaining a sense of continuous view of the side covers 68, 69 and the side surface of the car and preventing passengers from falling down to the track through a clearance between the articulating section and the platform.

The side covers 68, 69 are respectively connected to the end framing 1a, 2a of the car bodies via pins 70 in such a manner as to be capable of rotating outwardly. At the same time, stoppers (not shown) are provided between each of the side covers 68, 69 and each of the end framing of the car bodies so that the side covers 68, 69 will not rotate inwardly more than a right angle with respect to the end surfaces of the cars. Furthermore, springs 71 for inwardly urging the side covers 68, 69 are provided. Rollers 72 are provided on the inner sides of the tips of the side covers 68, 69 so that the side covers 68, 69, when brought into contact with the center cover 66, will move smoothly.

Figure 14:
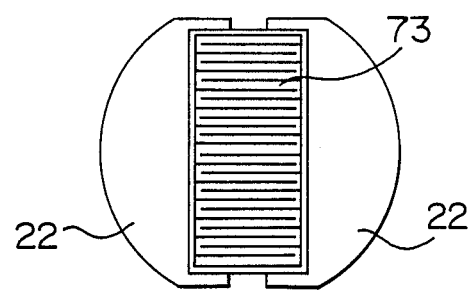
FIG. 14 is a schematic top plan view of a footplate of gangway portion.

As shown in FIG. 14, a comb floor 73 is installed between the opposing portions of the lower plates 22 in the inner corridors 19, 20. The comb floor 73 is arranged by allowing a pair of articulated floors to engage with each other and by coating their outer surfaces with a resilient material. Hence, the comb floor 73 can be readily deformed with respect to a torsional force, and no steps are created even when torsion is created, this arrangement being already known. In addition, opposite ends of this comb floor 73 are respectively coupled with the lower plates 22 of the inner corridors 19, 20, and the upper surface of the comb floor 73 is set to be identical with the upper surfaces of the lower plates 22.

Portions of the outer corridors 5, 6, the inner corridors 19, 20, and the inner frames 34, 35 that face the articulating section's corridor are formed with decorative boards.

A description will now be given of the operation of this embodiment.

When the cars are traveling on a flat straight track, this gangway apparatus maintains a posture shown in FIGS. 1 to 4.

Figure 15:
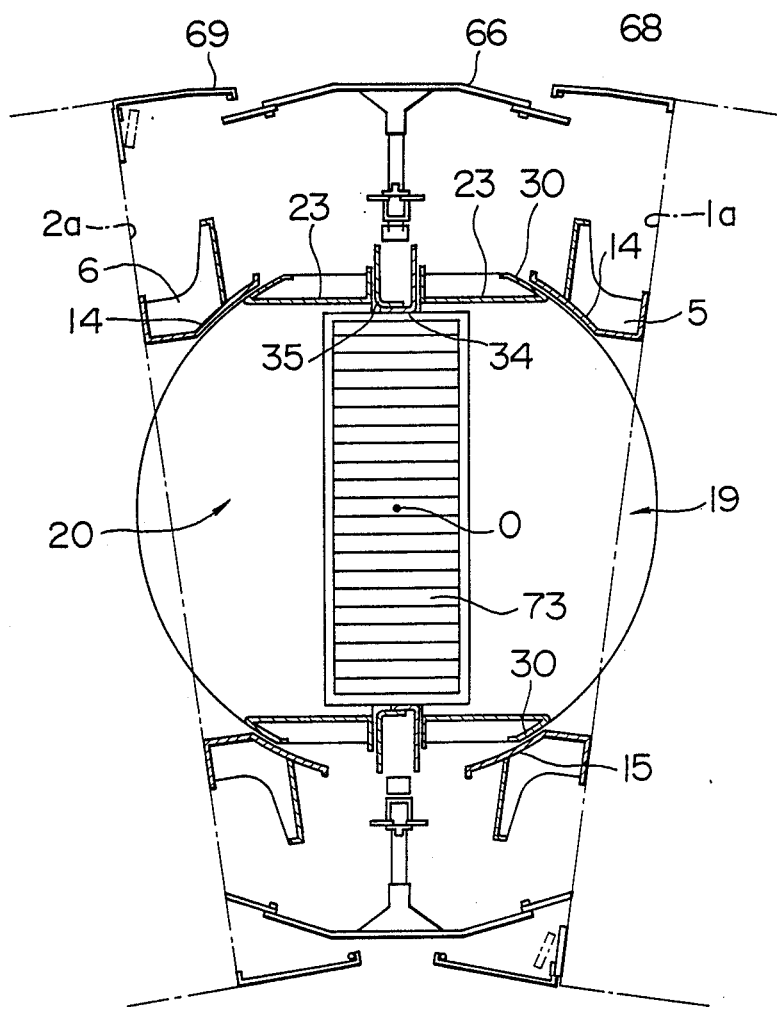
FIG. 15 is a horizontal cross-sectional view illustrating an operating condition.

When the cars travel on a horizontally curved track, the state in which the end framing 1a, 2a of the car bodies 1, 2 are parallel with each other is lost, as shown in FIG. 15. At this time, the outer corridors 5, 6 fixed to the car bodies 1, 2 rotate with the center point 0 of the articulating section's corridor as a center, and rotate as the rollers 11, 12, 13 of the outer corridors 5, 6 are guided by the arcuate guides 26, 27, 32 formed in the inner corridors 19, 20. Furthermore, arcuate guide walls 14, 15 formed on the sides of the outer corridors 5, 6 rotate so as to slide along the arcuate surfaces 30 of the inner corridors 19, 20. For this reason, the displacement of the car bodies is carried out without any hindrances, and the component members of the articulating section's corridor are displaced by following the displacement of the car bodies without any hindrances.

Next, when the car bodies 1, 2 undergo rolling, the inner frames 34, 35 located at the central portion do not move, but the outer corridors 5, 6 and the inner corridors 19, 20 undergo rolling together with the car bodies. At this juncture, the inner corridors 19, 20 undergo rolling as the engaging grooves 33 formed on the upper frame 21 of each of the inner corridors 19, 20 move by being guided by the rollers 45, 46 provided to the inner frames 34, 35 so as to maintain the state of coupling between the inner corridors 19, 20 and the inner frames 34, 35. In order that the relative displacement of the inner corridors 19, 20 and the inner frames 34, 35 due to rolling will be carried out without any hindrances, the support shafts of the rollers 45, 46 are inclined and the side walls of the engaging grooves 33 are formed high toward the inner sides of the inner corridors 19, 20, as shown in FIG. 5.

When the cars pass over a convex-shaped curve, the end framings of the car bodies 1, 2 are inclined in such a state that a gap between their upper portions is wider than that between their lower portions. Because of this wider gap in the upper portions, a gap between upper portions of the opposed sides of the inner corridors 19, 20 becomes wider in the same way as the end surfaces of the car bodies. At this time, since the engaging grooves 33 formed in the inner corridors 19, 20 are fitted with the rollers 45, 46 provided on the upper portions of the inner frames 34, 35, the upper portions of the inner frames 34, 35 are respectively pulled toward their respective inner corridors. Consequently, in FIG. 4, the inner frame 34, 35, which are fitted with each other such as to be movable with respect to each other, swing open with the upper portions thereof inclined toward the respective inner corridors 19, 20 around the pin 47 located at the lower ends thereof. The degree of overlapping of the inner frames 34, 35 is determined in such a manner that the state of fitting at their upper portions will not be canceled in such an opening action.

When the cars pass over a concave-shaped curve, the end framing of the car bodies 1, 2 are inclined in such a state that, conversely, a gap between their lower portions is wider than that between their upper portions. In this case, contrary to the above-described case, the inner frames 34, 35 move in such a manner that the upper portions of the inner frames enter into each other with the lower pins 47, 48 as a center.

Since the front and rear inner frames 34, 35 are connected to each other by pins via the coupling bar 57 constituted by pantagraph mechanisms pinned to the shell support 53, the shell support 53 is constantly held in a posture in which the shell support 53 is located at a bisector of an angle formed by the end surfaces of the car bodies 1, 2 in a horizontal plane during the above-described various operations. For this reason, the center cover 66 provided for the shell support 53 can always be located at a center between the end surfaces. In addition, the diaphragm 65 can be installed by being split into two with the shell support 53 as a center to facilitate maintenance work.

Accordingly, it should be understood that we intend to cover by the appended claims all modifications falling under the true spirit and scope of our invention.

What is claimed is:

1. A gangway apparatus of an articulating section for use in articulated cars, comprising:
    a pair of rectangular outer corridors respectively provided to end framing of car bodies to be articulated in such a manner as to project therefrom and surround corridor entrances of said car bodies;
    a pair of rectangular inner corridors each adapted to partially fit with each of said outer corridors in a connected manner; and
    a pair of gate-shaped inner frames each connected to the other end of each of said inner corridors, said inner frames being fitted with each other such as to be swingable in the direction of said articulating section's corridor with lower ends thereof as a supporting point,
    wherein said rectangular outer corridors, said inner corridors, and said inner frames constitute peripheral walls of said articulating section's corridor, fitting portions of said outer corridors and said inner corridors are arranged to be rotatable around a center point of said articulating section's corridor, coupling portions of each of said inner corridors and each of said inner frames are adapted to move together with respect to movement in the direction of said articulating section's corridor and can be slid and displaced relative to each other with respect to a direction perpendicular to that of said articulating section's corridor.

2. A gangway apparatus of an articulating section for use in articulated cars, comprising:
    a pair of rectangular outer corridors respectively provided to end framing of car bodies to be articulated, in such a manner as to project therefrom and surround corridor entrances of said car bodies;
    a pair of rectangular inner corridors each adapted to partially fit with each of said outer corridors in a connected manner;
    a pair of gate-shaped inner frames each connected to each of said inner corridors on the side of a central portion of an articulating section's corridor, said inner frames being fitted with each other such as to be swingable in the direction of said articulating section's corridor with lower ends thereof as a supporting point;
    a shell support provided around outer peripheries of intermediate portions of said inner frames with a lower end thereof serving as a supporting point, said inner frames and said shell support being coupled with each other by means of a coupling bar expandable in the direction of said articulating section's corridor; and
    a stretchable diaphragm disposed between said shell support and said outer corridors,
    wherein said rectangular outer corridors, said inner corridors, and said inner frames constitute peripheral walls of said articulating section's corridor, fitting portions of said outer corridors and said inner corridors are arranged to be rotatable around a center point of said articulating section's corridor, coupling portions of each of said inner corridors and each of said inner frames are adapted to move together with respect to movement in the direction of said articulating section's corridor and can be slid and displaced relative to each other with respect to a direction perpendicular to that of said articulating section's corridor.

3. A gangway apparatus of an articulating section for use in articulated cars, comprising:
- a pair of rectangular outer corridors respectively provided to end framing of car bodies to be articulated in such a manner as to project therefrom and surround corridor entrances of said car bodies;
- a pair of rectangular inner corridors each adapted to partially fit with each of said outer corridors in a connected manner;
- a pair of gate-shaped inner frames each connected to each of said inner corridors on the side of a central portion of an articulating section's corridor, said inner frames being fitted with each other such as to be swingable in the direction of said articulating section's corridor with lower ends thereof as a supporting point;
- a shell support provided around outer peripheries of intermidiate portions of said inner frames with a lower end thereof serving as a supporting point, said inner frames and said shell support being coupled with each other by means of a coupling bar expandable in the direction of said articulating section's corridor;
- a stretchable diaphragm disposed between said shell support and said outer corridors;
- side covers each disposed on the outer peripheries of said end framing of said car bodies such as to project therefrom and oppose each other; and
- a pair of center covers each of which is disposed on the inner sides of said side covers and whose opposite sides overlap with said side covers, wherein said rectangular outer corridors, said inner corridors, and said inner frames constitute peripheral walls of said articulating section's corridor, fitting portions of said outer corridors and said inner corridors are arranged to be rotatable around a center point of said articulating section's corridor, coupling portions of each of said inner corridors and each of said inner frames are adapted to move together with respect to movement in the direction of said articulating section's corridor and can be slid and displaced relative to each other with respect to a direction perpendicular to that of said articulating section's corridor.

* * * * *